(12) United States Patent
Stewart et al.

(10) Patent No.: US 8,282,013 B2
(45) Date of Patent: Oct. 9, 2012

(54) RFID-TAGGED SEAL

(75) Inventors: Shelby F. Stewart, Parksville, KY (US);
Eric J. Banks, Richmond, KY (US);
Daniel H. Ewing, Lexington, KY (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 13/139,314

(22) PCT Filed: Mar. 4, 2009

(86) PCT No.: PCT/US2009/036002
§ 371 (c)(1),
(2), (4) Date: Jun. 13, 2011

(87) PCT Pub. No.: WO2010/082945
PCT Pub. Date: Jul. 22, 2010

(65) Prior Publication Data
US 2011/0240747 A1    Oct. 6, 2011

Related U.S. Application Data

(60) Provisional application No. 61/145,145, filed on Jan. 16, 2009.

(51) Int. Cl.
*G06K 19/06* (2006.01)

(52) U.S. Cl. .................. 235/492; 340/572.1; 340/853.3

(58) Field of Classification Search .................. 235/492; 340/572.1, 853.3
See application file for complete search history.

(56) References Cited

U.S. PATENT DOCUMENTS

| | | | |
|---|---|---|---|
| 5,803,269 A * | 9/1998 | Jacoby et al. | 206/592 |
| 7,158,034 B2 | 1/2007 | Corbett, Jr. | |
| 7,398,692 B2 | 7/2008 | Hiroki et al. | |
| 2003/0048198 A1* | 3/2003 | Schultz et al. | 340/853.3 |
| 2003/0160391 A1 | 8/2003 | McEwan | |
| 2007/0115131 A1 | 5/2007 | Seriu et al. | |
| 2008/0258401 A1 | 10/2008 | Cotton | |

OTHER PUBLICATIONS

Notification of Transmittal of The International Search Report and the Written Opinion, dated Mar. 4, 2009, in corresponding International Application No. PCT/US2009/036002.

Notification of Transmittal of the International Preliminary Report on Patentability, dated Apr. 19, 2011, in corresponding International Application No. PCT/US2009/036002.

* cited by examiner

*Primary Examiner* — Allyson Trail
(74) *Attorney, Agent, or Firm* — John A. Molnar, Jr.

(57) ABSTRACT

O-ring or other fluid seal member (10) and method of making such member. The member has a body (12) provided as a preform of a curable elastomeric polymeric material. A radio frequency identification (RFID) transponder (50) is inserted into the preform. The preform is then cured to form the body and to embed the RFID transponder (50) therein.

6 Claims, 3 Drawing Sheets

RFID-TAGGED SEAL

BACKGROUND OF THE INVENTION

The present invention relates broadly to the use of radio frequency identification (RFID) transponders which are embedded into an elastomeric fluid seal member for purposes of tracking or otherwise identifying the member or details thereof.

RFID and other identification and tracking methods and devices are shown, for example, in U.S. Pat. Nos. 7,398,692; 7,158,034; and 7,0678,170, and in U.S. Pat. Appln. Pub. Nos. US2003/0160391 and 2008/0258401.

Fluid seals, also known as packings or gaskets, for machine and other part joints are well-known in the art. Typical applications therefor involves the provision of a fluid seal intermediate relatively movable, i.e., dynamic, or fixed, i.e., static, surfaces. Such seals conventionally are configured as a ring or other closed geometric shape, or as a strip or other length, which is molded or otherwise formed of a resilient material such as an elastomeric polymeric material which may be a natural or synthetic rubber.

Ideally, fluid seal members of the type herein involved should provide effective sealing under static and dynamic conditions, at both low and high pressures, and with a minimum of static and dynamic friction for a long, maintenance-free service life. As the demands placed on seals continue to increase, it is believed that further improvements in the functionality thereof would be well-received by various industries.

BROAD STATEMENT OF THE INVENTION

The present invention is directed to the use of radio frequency identification (RFID) transponders which are molded or otherwise embedded into the body of an elastomeric fluid seal member. The member which is so tagged with the RFID transponder may be in the configuration of an o-ring, sanitary gasket, or other shape or length.

For assembly, inventory control, and/or maintenance by the manufacturer, stocking distributor, and/or end user, the transponder may be programmed with information specific to the seal such as its part, serial, batch and/or lot number, material code, dimensions, date of manufacture, sale, installation, and/or expiration date. The transponder also may be programmed with a unique identifier or code which may be cross-referenced to an electronic database or other compilation of such information.

In the manufacture of the RFID-tagged seal of the present invention, one or more RFID transponders are embedded into the body the seal. In this regard, the body initially may be provided as a ring or other closed or open geometric shape or length of a preform which itself is injection or compression molded, extruded, or otherwise formed of a "green," i.e., unvulcanized or otherwise uncured or partially cured, elastomeric polymeric material such as a natural or synthetic rubber. The RFID transponder, which may be in the form of a tag or similar device, then may be inserted into the cross-section of the preform. The preform with the RFID tag so inserted then may be subjected to conventional processing such as heated compression or other molding to cure the preform and thereby form the body of the seal with the RFID transponder embedded therein. Advantageously, in such method the RFID transponder may be generally centered in the seal relative to the central horizontal and/or vertical axes of the body cross-section. In this way, the transponder may be entirely encased within the seal body so as to not interfere with the proper functioning of the seal when placed in service.

The present invention, accordingly, comprises the construction, combination of elements, and/or arrangement of parts and steps which are exemplified in the detailed disclosure to follow. Advantages of the present invention include a seal having an integrated RFID transponder for tracking, monitoring, and otherwise identifying the seal. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
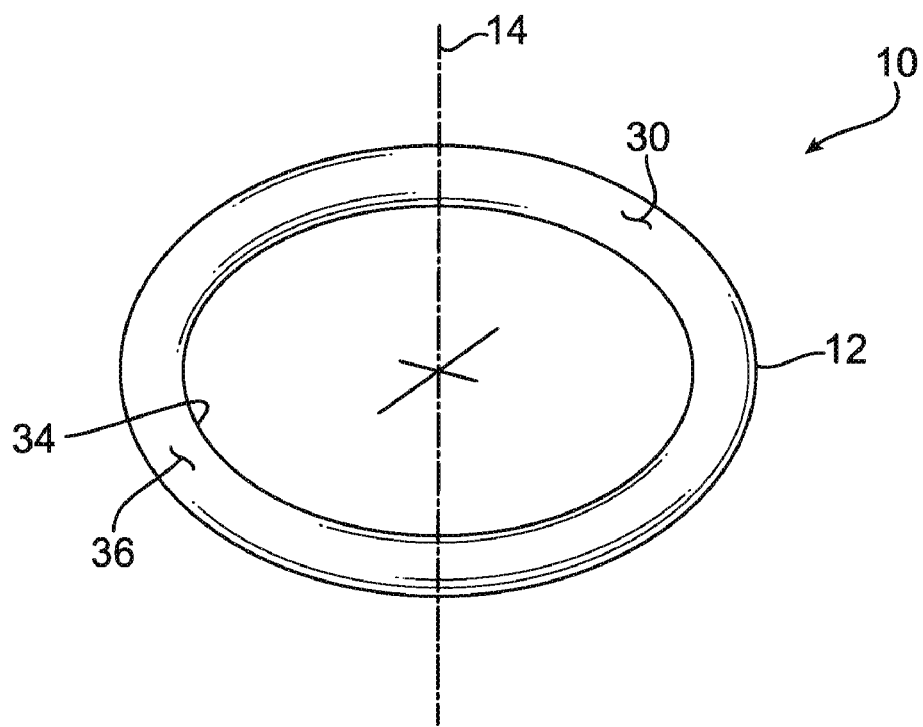
FIG. 1 is a perspective view of an illustrative embodiment of an RFID-tagged fluid seal member according to the present invention, such member being depicted as having the general shape of an o-ring.

Certain terminology may be employed in the following description for convenience rather than for any limiting purpose. For example, the terms "forward" and "rearward," "front" and "rear," "right" and "left," "upper" and "lower," and "top" and "bottom" designate directions in the drawings to which reference is made, with the terms "inward," "inner," "interior," or "inboard" and "outward," "outer," "exterior," or "outboard" referring, respectively, to directions toward and away from the center of the referenced element, the terms "radial" or "horizontal" and "axial" or "vertical" referring, respectively, to directions or planes which are perpendicular, in the case of radial or horizontal, or parallel, in the case of axial or vertical, to the longitudinal central axis of the referenced element, and the terms "downstream" and "upstream" referring, respectively, to directions in and opposite that of fluid flow. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows. Angles may be designated as "included" as measured relative to surfaces or axes of an element and as defining a space bounded internally within such element therebetween, or otherwise without such designation as being measured relative to surfaces or axes of an element and as defining a space bounded externally by or outside of such element therebetween. Generally, the measures of the angles stated are as determined relative to a common axis, which axis may be transposed in the figures for purposes of convenience in projecting the vertex of an angle defined between the axis and a surface which otherwise does not extend to the axis. The term "axis" may refer to a line or to a transverse plane through such line as will be apparent from context.

For illustrative purposes, the precepts of the RFID-tagged fluid seal of the invention herein involved are described principally in connection with its configuration as an o-ring or as a sanitary gasket having a generally circular circumference. Such seals are used for a variety of fluid, i.e., liquid, gas, particulate solids, and/or plasmas, sealing applications. In view of the discourse to follow, however, it will be appreciated that aspects of the present invention may find utility in other seal configurations having circumferences or perimeters of other regular or irregular geometries, or in linear or rectilinear, or curvilinear or otherwise actuate open geometries such as strips or other lengths. Use within those such other shapes and lengths therefore should be considered to be expressly within the scope of the present invention.

Figure 2:
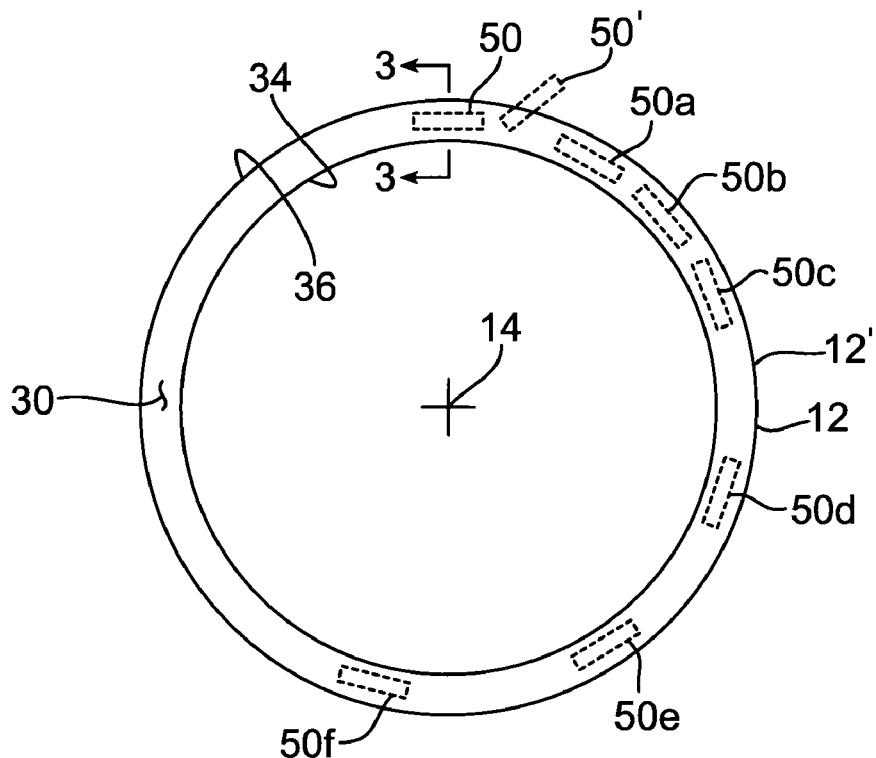
FIG. 2 is a top view of the fluid seal member of FIG. 1.
Figure 3:
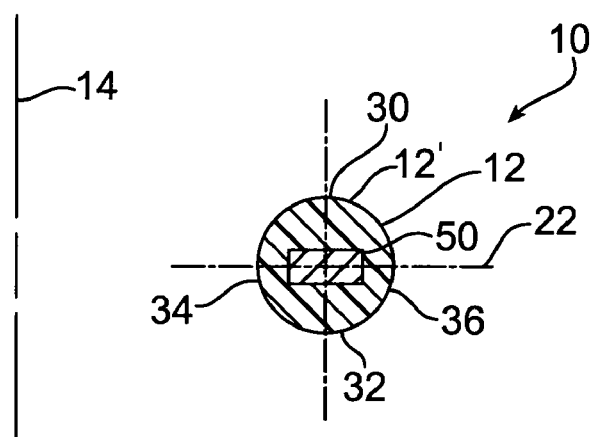
FIG. 3 is a radial cross-sectional view of the fluid seal member of FIG. 2 taken through line 3-3 of FIG. 2.

Referring then to the figures wherein corresponding reference characters are used to designate corresponding elements throughout the several views with equivalent elements being referenced with prime or sequential alphanumeric designations, a representative o-ring according to the present invention is shown generally at 10 in the perspective view of FIG. 1 and the top view of FIG. 2. In the unstressed or free state of the seal ring 10 which is depicted in FIGS. 1 and 2, the seal ring 10 has a body, 12, which extends around a longitudinal axis, 14, in defining a generally circular circumference. As may be seen best with additional reference to the radial cross-sectional view of FIG. 3, body 12 may have a generally circular profile which is centered relative to a vertical seal axis, 20, disposed generally parallel to longitudinal axis 14, and a horizontal seal axis, 22, disposed orthogonally to the vertical axis 20. Although the profile of seal body 12 is shown in FIG. 3 to be circular, such profile alternatively may be semicircular, i.e., D-shaped, elliptical, or otherwise actuate, polygonal, i.e., square, rectangular, or trapezoidal, lobed, i.e., X- or M-shaped, or other regular or irregular geometric shape. Depending on such shape, seal ring 10 may be present in service upper and lower, 30 and 32, and inner and outer diameter, 34 and 36, sealing faces such as when compressed intermediate relatively movable, i.e., dynamic, or fixed, i.e., static, mating machine parts, hardware, or other surfaces.

The body 12 of seal ring 10 may be conventionally molded, extruded and cut, or otherwise formed of an elastomeric material which specifically may be selected for low or high temperature performance, flexibility, or otherwise for compatibility with the fluid being handled. Suitable materials, which may be filled, for example, with glass or carbon black, or which may be unfilled, include natural rubbers such as Hevea and thermoplastic, i.e., melt-processible, or thermosetting, i.e., vulcanizable, synthetic rubbers such as: fluoro- or perfluoroelastomers, chlorosulfonate, polybutadiene, butyl, neoprene, nitrile, polyisoprene, buna-N, copolymer rubbers such as ethylene-propylene (EPR), ethylene-propylene-diene monomer (EPDM), acrylonitrile-butadiene (NBR or HNBR) and styrene-butadiene (SBR), and blends such as ethylene or propylene-EPDM, EPR, or NBR. The term "synthetic rubbers" also should be understood to encompass materials which alternatively may be classified broadly as thermoplastic or thermosetting elastomers such as polyurethanes, silicones, fluorosilicones, styrene-isoprene-styrene (SIS), and styrene-butadiene-styrene (SBS), as well as other polymers which exhibit rubber-like properties such as plasticized nylons, polyolefins, polyesters, ethylene vinyl acetates, fluoropolymers, and polyvinyl chloride. As used herein, the term "elastomeric" is ascribed its conventional meaning of exhibiting rubber-like properties of compliancy, resiliency or compression deflection, low compression set, flexibility, and an ability to recover after deformation, i.e., stress relaxation.

Figure 4:
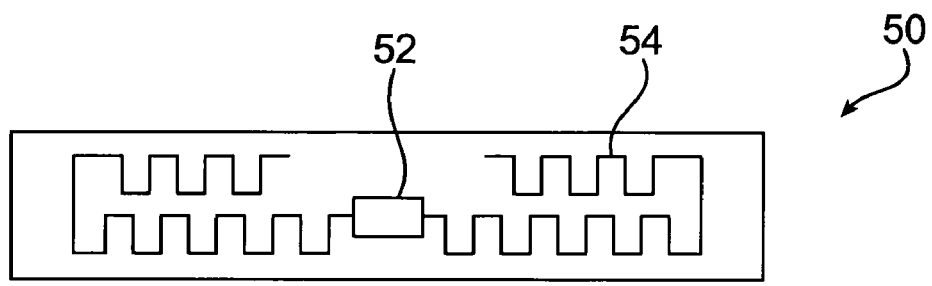
FIG. 4 is a top cut-away view of a representative RFID transponder for implantation into the RFID-tagged fluid seal of the present invention.

With reference again to the top and cross-sectional views of FIGS. 2 and 3, one or more RFID transponders, one of which is shown in phantom at 50 in FIG. 1, are embedded in the cross-section of the body 12. With momentary reference to the cut-away view of FIG. 4, transponder 50 may be provided as a passive tag or similar device including a onboard chip, 52, which may function both as a radio receiver and transmitter, as well as an electronic data storage medium, and tuned conductor, 54, which acts as an antenna. As it may be so provided, such transponder 50 requires neither an internal power source which would need replacement, nor an external power source or other component which would require hardwire or other connections extending out of the body 12 that could interfere with the sealing function of the seal ring 10. Transponder 50 thus may be completely encapsulated within the seal body 12 and thereafter need not be removed therefrom.

It will be appreciated that as may be configured as shown as having generally linear dimensions, the precise length or longer dimension of the transponder 50 and the thickness thereof will determine, respectively, the minimum radius of curvature and radial cross-sectional thickness of the seal ring 10. Such minimums are necessary to provide a sufficient sealing thickness of the elastomeric material of the seal body 12, and otherwise to entirely embed the transponder 50 within the seal body 12 such that no part of the transponder 50 protrudes out of the body 12. In this regard, the use of smaller RFID tags will be understood to allow for the use of a smaller seal body 12. Alternately, larger diameter or cross-section seals, or those having a circumference or perimeter with a linear section, will allow for the use of a longer and/or thicker RFID tags which may include a bigger antenna for increased signal range.

Returning now to FIGS. 2 and 3, in the manufacture of seal ring 10, seal body 12 initially is supplied as a ring of a preform, commonly referenced with body 12 at 12', having substantially the same nominal dimensions. The preform 12' may be injection or compression molded, extruded, or otherwise formed of a "green," i.e., unvulcanized or otherwise uncured or partially cured, form-stable, generally viscoelastic mass of elastomeric polymeric material such as a natural or synthetic rubber. With the preform 12' being so provided in such uncured state, RFID transponder 50 thus may be inserted into the cross-section of the preform, such as through one of the faces 30, 32, 34, or 36 thereof as is shown in phantom at 50' in FIG. 2.

As may be seen best in FIG. 3, such insertion may center the transponder 50 in the cross-section of the body 12 relative to the relative to the vertical seal axis 20 and/or the horizontal seal axis 22. Such centering serves to protect the transponder 50 during subsequent processing of the preform 12' and to provide reliable sealing functions in the finished seal ring 10. Moreover, by so centering the transponder 50, compressive loads imposed on the sign ring 10 in service may be better distributed to protect the transponder 50 from damage. Also, the transponder 50 may be better protected from high or low temperature extremes by the inherent insulation of the rubber material forming the body 12. The insertion of the transponder 50 into the preform 12' may be performed manually or, alternatively, with the assistance of a jig or guide and/or under automated control.

Multiple transponders 50, as shown at 50a-f, may be so implanted into preform 12'. By implanting multiple transponders 50 as a grouping in a defined segment of the circumference of the preform 12', such as is shown for the transponders 50a-c, the information storage capacity of the seal ring 10 may be increased. Alternatively, by distributing the transponders 50 along the circumference of the preform 12', such as is shown for the transponders 50d-f, the seal ring 10 may be "read" from different locations along its circumference which may be desirable in the case of a large diameter seal ring 10 or one which is installed in a hard-to-reach location. For larger diameter seals, a color or other marking may be applied to the outer surface thereof to identify the locations of the one or more transponders 50.

Following the insertion of the one or more RFID transponders 50 into preform 12' in the manner so described, preform 12' thereupon may be subjected to conventional processing, such as heated compression or other molding, to cure the preform 12' and thereby form the body of the seal with the RFID transponder embedded therein. By "cured" it is meant that the material of the preform 12' may be polymerized, cross-linked, further cross-linked or polymerized, vulcanized, cooled, hardened, or otherwise chemically or physically changed from its form-stable viscoelastic state into a solid or more-solid elastomeric state or form. Advantageously, the transponder 50 has observed to not substantially migrate within the preform 12' during subsequent processing such that it may remain centered within the finished seal body 12.

Following such processing, the transponder 50 may be encoded or otherwise programmed with information specific to the seal ring 10 such as its part, serial, batch and/or lot number, material code, dimensions, date of manufacture, sale, installation, and/or expiration date. Transponder 50 also may be programmed with a unique identifier or code which may be cross-referenced to an electronic database or other compilation of such information. With transponder 50 so programmed, it may be queried with an associated reader (not shown) which likewise may be programmed to store and interpret the data received from the transponder 50. Such data may be used by a manufacturer, stocking distributor, and/or end user before or after the seal ring is put into service, such as for assembly, inventory control, and/or maintenance purposes. For example, seal ring 10 may be identified using the reader without the need for supporting documentation such as a label or packaging. The ring 10 also may be linked via the reader to application, service, or other information provided by the manufacturer.

Within a warehouse environment, the ring 10 if misplaced may be identified and re-labeled rather than discarded. An assembly, maintenance, or repair person can verify the part number of the ring 10 prior to installation or replacement and, if the design of the mating parts permits, that the correct ring 10 has been installed after the assembly or what kind of ring 10 needs replacement prior to disassembly. Each of these situations represents a significant cost savings in terms of avoiding stock losses, assembly errors, and maintenance down time.

In service, seal ring 10 may be compressed by between about 10-30%, such as mounted in an associated groove or gland, or otherwise intermediate relatively movable, i.e., dynamic, or fixed, i.e., static, mating machine parts, hardware, or other surfaces, to provide a fluid seal between the surfaces which themselves may be formed of metal or plastic.

It should be appreciated that the ability to read the transponder 50 in situ will depend on various factors, although it is believed that in many applications the signal from the reader may be transmitted through the seal, energize the transponder 50, and then be transmitted back as a return signal without undue attenuation. This is particularly so in the case of sanitary gasket applications in which the mating hardware does not fully encase the gasket.

Figure 5:
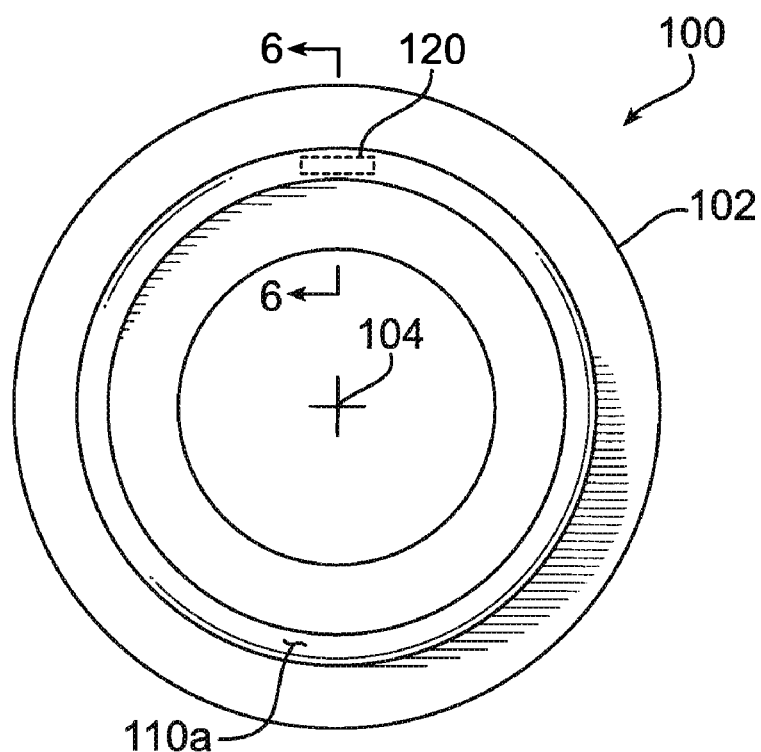
FIG. 5 is a top view of an alternative embodiment of a fluid seal member according to the present invention, such member being depicted as having the general shape of a sanitary gasket.
Figure 6:
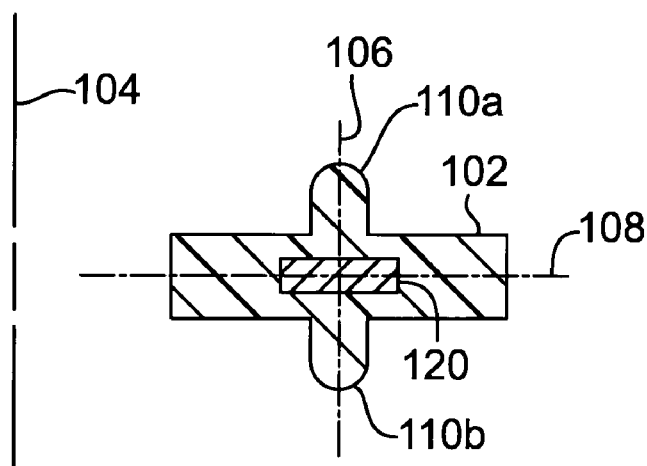
FIG. 6 is a radial cross-sectional view of the fluid seal member of FIG. 5 taken through line 6-6 of FIG. 5.

Looking lastly to FIG. 5, an another illustrative RFID-tagged fluid seal in accordance with the present invention is shown generally at 100 as configured as a sanitary gasket such as commonly used in the pharmaceutical, food and beverage, and cosmetics industries. In general shape, gasket 100 has a body, 102, which extends around a longitudinal axis, 104, in defining a generally circular circumference. As may be seen best with additional reference to the radial cross-sectional view of FIG. 6, body 102 may have a generally rectangular profile which again is centered relative to a vertical seal axis, 106, disposed generally parallel to longitudinal axis 146, and a horizontal seal axis, 108, disposed orthogonally to the vertical axis 106. In the embodiment shown, gasket 100 has upper and lower sealing faces, 110a-b, which are configured in the form of generally hemispherical lobes. Such lobes may be provided to be received to seat the gasket within corresponding grooves formed into the surface of the mating parts (not shown) between which the gasket 100 may be mounted. In other respects, gasket 100 is similar to seal ring 10 of the preceding figures in structure and use, with one or more RFID transponders, one of which is referenced at 120, being embedded in body 102 as again centered with respect to the axes 106 and 108.

It is anticipated that certain changes may be made in the present invention without departing from the precepts herein involved. Accordingly, the foregoing description should be interpreted as illustrative and not in a limiting sense. All references including any priority documents cited herein are expressly incorporated by reference.

What is claimed is:

1. A method of making a fluid seal member comprising the steps of
    (a) providing a preform of a body, the body having in cross-section a central horizontal seal axis and a central vertical seal axis orthogonal to the horizontal seal axis, and the preform being formed of a curable elastomeric polymeric material;
    (b) inserting a radio frequency identification (RFID) transponder into the preform; and
    (c) curing the preform to form the body and embed the RFID transponder entirely therein.

2. The method of claim 1 wherein the RFID transponder is inserted in step (b) as being generally centered in the body relative to the horizontal seal axis.

3. The method of claim 1 wherein the RFID transponder is inserted in step (b) as being centered in the body relative to the vertical seal axis.

4. The method of claim 3 wherein the RFID transponder is inserted in step (b) as being centered in the body relative to the horizontal seal axis.

5. The method of claim 1 wherein the preform is provided in step (a) with the elastomeric polymeric material comprising a natural or synthetic rubber.

6. The method of claim 1 wherein the preform is provided in step (a) with the body extending about a longitudinal axis generally parallel to the vertical axis in defining a closed geometric shape.

* * * * *